April 29, 1958 — R. D. HARDESTY — 2,832,222
FOOD MIXERS
Filed Jan. 6, 1954
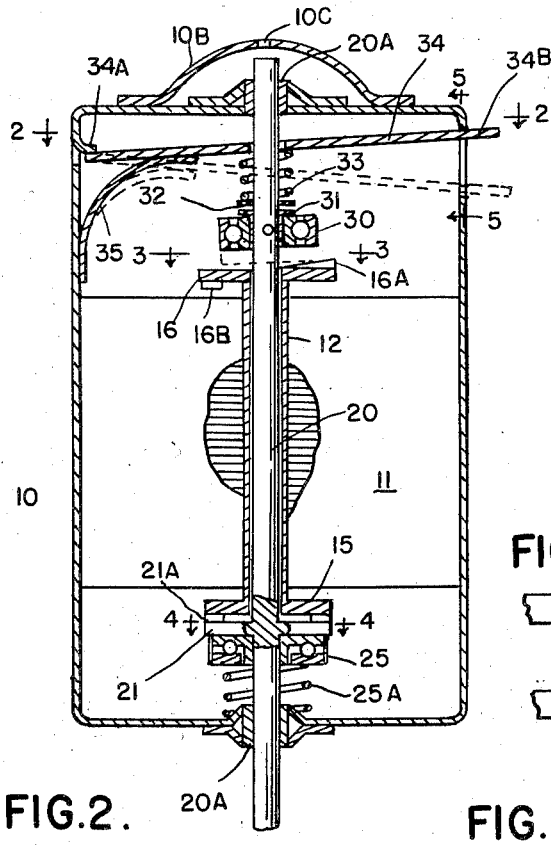
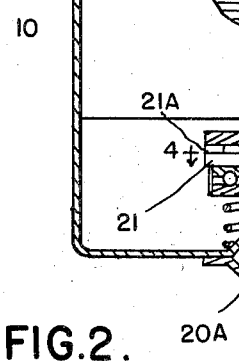
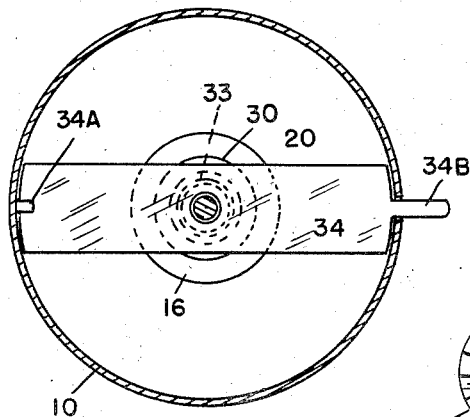
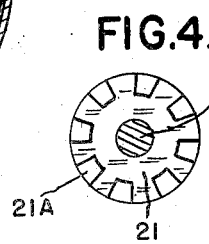
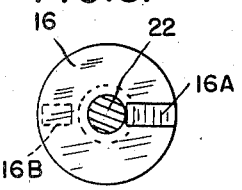
INVENTOR.
RICHARD D. HARDESTY
ATTORNEYS

United States Patent Office 2,832,222
Patented Apr. 29, 1958

2,832,222

FOOD MIXERS

Richard D. Hardesty, Wichita, Kans.

Application January 6, 1954, Serial No. 402,467

4 Claims. (Cl. 74—1)

The present invention relates to electrically operated food mixers or liquid blending devices, and has among its objects the provision of a device which allows the operator a choice of mixing or blending operations.

Another object is to provide a mixer or blender in which a spindle carrying suitable blades or paddles may be rotated or oscillated longitudinally at will.

Another object is to simplify the construction and operation of such devices.

Still other objects and advantages will readily occur to those skilled in the art upon reference to the following description and the accompanying drawings in which Fig. 1 is a central vertical sectional view of the mixer omitting the mixing blades.

Fig. 2 is a section on line 2—2 of Fig. 1.

Fig. 3 is a section on line 3—3 of Fig. 1.

Fig. 4 is a section on line 4—4 of Fig. 1.

Fig. 5 is a section on line 5—5 of Fig. 1.

Figs. 6, 7 and 8 are fragmentary sectional views showing a modified form.

In the drawing, the device is indicated as consisting of a suitable casing 10 in which is mounted a suitable electric motor shown conventionally at 11, but shown as provided with a hollow shaft 12 having at the ends thereof flanges 15 and 16.

Extending through the casing and shaft 12 is a spindle 20, mounted in suitable bearings 20A and provided with flange 21 in the form of a disc of substantially the same size as the shaft flange 15, and assembled adjacent thereto and capable of contact therewith. The contacting surfaces of flanges 15 and 21 may be ribbed or provided with interlocking teeth or lugs 21A or otherwise finished to provide for rotating the spindle.

Arranged to cooperate with flange 21 is a suitable thrust bearing 25 supported upon and thrust upwardly by a suitable compression spring 25A which abuts the bottom of casing 10.

Near the upper end of spindle 20 is fixed a diagonally arranged plate member consisting preferably of a suitable ball bearing 30, the inner race of which is fixed to the spindle preferably upon a sleeve 31 so formed as to hold the plane of bearing 30 at an angle to the axis of the spindle and provided with a flange adapted to serve as one member of a brake 32. The other member of brake 32 is carried by a spring 33 fixed to a lever 34 extending across the casing and fulcrumed at 34A. At its free end the lever 34 is provided with an extension 34B which projects from the casing through an L-shaped opening 10A. A suitable spring 35 is arranged to hold the lever 34 in its upward position and in the upper part of opening 10A.

Arranged to coact with the outer race of bearing 30 under certain conditions is a lug 16A carried upon the upper face of the shaft flange 16.

In constructing the device, the spring 33 should be of such length as to maintain open the brake 32 when the lever 34 is in the upper full line position of Fig. 1. In such position, the clutch 15—21 is engaged and the spindle 20 is rotatable by the motor 11. The spring 33 should also be of sufficient strength so that when the lever 34 is moved to its lower position and held in the horizontal portion of opening 10A, it will, first, engage brake 32, then move the spindle 20 downwardly, disengaging clutch 15—21 and compressing spring 25A. This movement of spindle 20 should be sufficient to cause the outer race of bearing 30 to contact the lug 16A on the shaft flange 16. In this position of the lever 34 and spindle 20, the latter is maintained against rotation, but when the motor 11 is operated, the spindle will be reciprocated longitudinally. It is of course to be understood that these several parts should be so related that when the spindle is being oscillated, the parts of clutch 15—21 will not come into engagement.

As shown in Fig. 1, the upper end of spindle 20 may be covered by a suitable protective cover 10B provided with an opening 10C through which lubricant may be introduced when desired.

Further, in order to maintain proper balance of the shaft 12, a counterbalance 16B may be fixed to the flange 16 opposite the lug 16A.

An alternate construction of the upper clutch and bearing unit 30 is shown in Figs. 6, 7 and 8. In these figures, instead of the bearing unit 30, an angularly arranged disc or plate 130 is used, this being a part of or fixed to a sleeve 131, in turn fixed to spindle 20.

To cooperate with the plate 130 the flange 16 will have mounted thereon near the outer edge, a small roller 116A or a ball 116B, preferably counterbalanced by a small diametrically opposite weight.

The operation of the device appears to be obvious. With a suitable paddle or other element fixed to the lower end of the spindle 20 the latter may be either rotated or oscillated or reciprocated longitudinally by changing the position of lever 34. When the clutch 32 is disengaged by elevation of the lever 34, the clutch 15—21 will be engaged and operation of the motor will rotate spindle 20. When the clutch 32 is engaged by lowering lever 34, the clutch 15—21 will be disengaged and operation of the motor will, through the action of the wobble plate 30 oscillate or reciprocate the shaft 20 longitudinally.

I claim:

1. An electric food mixer comprising a casing, a motor mounted therein and having an armature shaft provided with an axial passage therethrough, a mixing spindle extending through said shaft passage, bearings in said casing for said spindle, clutch means at one end of said armature shaft for connecting the shaft and spindle in rotary driving relation, brake means at the other end of said armature shaft for preventing shaft rotation, means for actuating said clutch and brake alternately and means operable, when the first mentioned clutch is disengaged, to cause longitudinal reciprocation of said spindle.

2. An electric mixer for fluid materials comprising a motor having an armature shaft provided with an axial bore and provided with a flange at each end, a mixing spindle extending through said bore, a spring actuated clutch at one end of said shaft for connecting said shaft flange and spindle in driving relation, an axial projection at the edge of the other shaft flange, a ball bearing unit having its inner race fixed to said spindle adjacent the other end of said shaft with the plane of said unit at an angle to the axis of the spindle, said unit being normally spaced from the shaft end, and manually operable means for moving said spindle longitudinally whereby to disconnect the spring actuated clutch and to cause contact between the axial projection on the adjacent shaft flange and the outer race of said unit, said moving means including brake means for preventing rotation of said spindle.

3. In an electric mixer for fluid materials, an electric motor, a mixing spindle, clutch means for connecting said spindle to said motor in rotary relation, motion converting means for converting the rotative effort of said motor into longitudinal reciprocating movement of said spindle and means for declutching said spindle and motor and then rendering operative said motion converting means, said declutching means including means for preventing rotation of said spindle.

4. In an electric food mixer, an electric motor including a rotatable armature shaft, a mixing spindle rotatable or longitudinally reciprocable by said motor at will, means for producing spindle rotation consisting of a disengageable clutch for engaging said spindle and shaft, a brake for maintaining said spindle against rotation and engageable only after disengagement of the clutch, a single means for actuating said clutch and brake at will, and means, operable when the brake is engaged, for converting the rotary motion of the motor shaft to the reciprocatory motion of the spindle.

References Cited in the file of this patent

UNITED STATES PATENTS

| | | |
|---|---|---|
| 1,356,556 | Payne | Oct. 26, 1920 |
| 2,477,755 | Langfelder | Aug. 2, 1949 |
| 2,531,849 | Karleen | Nov. 28, 1950 |